US012460557B1

(12) United States Patent
Pebley et al.

(10) Patent No.: US 12,460,557 B1
(45) Date of Patent: Nov. 4, 2025

(54) VARIABLE PITCH AIRFOIL ASSEMBLY FOR A GAS TURBINE ENGINE

(71) Applicant: General Electric Company, Evendale, OH (US)

(72) Inventors: Zachary Pebley, Fairfield Township, OH (US); Suryarghya Chakrabarti, Mason, OH (US); Shawn P. Riley, Liberty Township, OH (US); Nicholas M. Daggett, Camden, ME (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/034,964

(22) Filed: Jan. 23, 2025

(51) Int. Cl.
*F01D 17/16* (2006.01)
*F01D 5/10* (2006.01)

(52) U.S. Cl.
CPC ............. *F01D 17/162* (2013.01); *F01D 5/10* (2013.01); *F05D 2260/96* (2013.01)

(58) Field of Classification Search
CPC ....... F01D 17/162; F01D 5/10; F05D 2260/96
See application file for complete search history.

(56) References Cited

U.S. PATENT DOCUMENTS

| | | | |
|---|---|---|---|
| 5,056,738 A | 10/1991 | Mercer et al. | |
| 5,065,959 A | 11/1991 | Bhatia et al. | |
| 5,306,118 A | 4/1994 | Holmes | |
| 5,308,226 A | 5/1994 | Venkatasubbu et al. | |
| 5,373,922 A | * 12/1994 | Marra | F16F 15/10 |
| | | | 188/379 |
| 5,462,410 A | 10/1995 | Smith et al. | |
| 6,767,183 B2 | 7/2004 | Schilling et al. | |
| 7,094,022 B2 | 8/2006 | Bruce | |
| 7,220,098 B2 | 5/2007 | Bruce et al. | |
| 7,717,670 B2 | 5/2010 | Foucher | |
| 7,946,818 B2 | 5/2011 | Berghella et al. | |
| 8,113,771 B2 | 2/2012 | Turnquist et al. | |
| 8,382,442 B2 | 2/2013 | Boston et al. | |
| 8,851,854 B2 | 10/2014 | Alexander | |
| 9,334,751 B2 | 5/2016 | Dube et al. | |
| 9,388,703 B2 | 7/2016 | Ikeguchi et al. | |
| 9,567,090 B2 | 2/2017 | Gallet et al. | |
| 10,036,269 B2 | 7/2018 | Ugarte et al. | |
| 10,287,910 B2 | 5/2019 | Hartung | |
| 10,486,794 B2 | 11/2019 | Kiesewetter et al. | |
| 11,359,509 B1 | 6/2022 | O'Brien | |

(Continued)

FOREIGN PATENT DOCUMENTS

| | | | |
|---|---|---|---|
| FR | 3087830 A1 | 5/2020 | |
| FR | 3120663 A1 | 9/2022 | |

(Continued)

*Primary Examiner* — Michael L Sehn
(74) *Attorney, Agent, or Firm* — McCarter & English, LLP (57) ABSTRACT

A variable pitch airfoil assembly for an engine includes a disk having an annular shape extending about an axial direction, an airfoil coupled to the disk via a platform, and at least one damping element disposed between the platform and the disk. The airfoil extends outwardly from the disk in a radial direction and is rotatable relative to the disk about a pitch axis. The at least one damping element is configured to provide vibration damping by friction between the at least one damping element, the disk, and the platform while also allowing for a pitch change of the airfoil.

20 Claims, 6 Drawing Sheets

(56) References Cited

U.S. PATENT DOCUMENTS

| | | | |
|---|---|---|---|
| 11,624,293 | B2 | 4/2023 | Ivakitch et al. |
| 11,821,320 | B2 | 11/2023 | Johnson et al. |
| 12,055,153 | B1 | 8/2024 | Chakrabarti et al. |
| 2016/0341068 | A1 | 11/2016 | Robertson, Jr. et al. |
| 2024/0035390 | A1 | 2/2024 | Johnson et al. |

FOREIGN PATENT DOCUMENTS

| | | |
|---|---|---|
| GB | 2504969 A | 2/2014 |
| WO | WO2021/216090 A1 | 10/2021 |

* cited by examiner

VARIABLE PITCH AIRFOIL ASSEMBLY FOR A GAS TURBINE ENGINE

FIELD

The present disclosure relates to variable pitch airfoil assemblies for gas turbine engines, and more particularly to vibration dampers for airfoils of gas turbine engines.

BACKGROUND

At least some gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine, such that the first drive shaft rotatably drives the compressor. The gas stream expands as it flows through a low-pressure turbine positioned aft of the high-pressure turbine. The low-pressure turbine includes a rotor assembly having a fan coupled to a second drive shaft. The low-pressure turbine rotatably drives the fan through the second drive shaft. Gas turbine engines further include various airfoils or blades throughout the various stages of the engine, such as fan blades, compressor blades, turbine blades, etc.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines as may be used in the present disclosure include unducted turbofan engines, ducted turbofan engines, or turboprop engines.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "vertical," "radial," "axial," "longitudinal," and derivatives thereof shall relate to the embodiments as they are oriented in the drawing figures. However, it is to be understood that the embodiments may assume various alternative variations, except where expressly specified to the contrary. It is also to be understood that the embodiments illustrated in the attached drawings, and described in the following specification, are simply exemplary embodiments of the disclosure. Hence, specific dimensions and other physical characteristics related to the embodiments disclosed herein are not to be considered as limiting.

The term "adjacent" as used herein with reference to two walls or surfaces refers to the two walls or surfaces contacting one another, or the two walls or surfaces being separated only by one or more nonstructural layers and the two walls or surfaces and the one or more nonstructural layers being in a serial contact relationship (i.e., a first wall/surface contacting the one or more nonstructural layers, and the one or more nonstructural layers contacting a second wall/surface).

As used herein, the term "integral" as used to describe a structure refers to the structure being formed integrally of a continuous material or group of materials with no seams, connections joints, or the like. The integral, unitary structures described herein may be formed through additive manufacturing to have the described structure, or alternatively through a ply layup process, a casting process, etc.

Variable pitch open rotor fans and outlet guide vanes (OGVs) may experience high vibrations due to flutter, fan blade wakes, engine core vibrations, or other synchronous excitations. Traditional vibration damping technologies do not allow the airfoils forming the fan blades and stator vanes to change pitch. In an example embodiment, the present disclosure is directed to damping concepts for variable stator vanes. For example, a damping element, such as a leaf spring, can be utilized with stationary (non-rotating) airfoils like OGVs. In such embodiments, the damping element(s) are placed under the blade platform and contact loads are generated by an interference fit at assembly.

Accordingly, the present disclosure provides many technical advantages, such as sufficient damping for fundamental modes, allowing for airfoil pitch change, and not relying on centrifugal loading to be effective. Moreover, the damping element(s) described herein are low-cost passive devices, retrofittable, and do not require changes in design to existing airfoil components.

Figure 1:
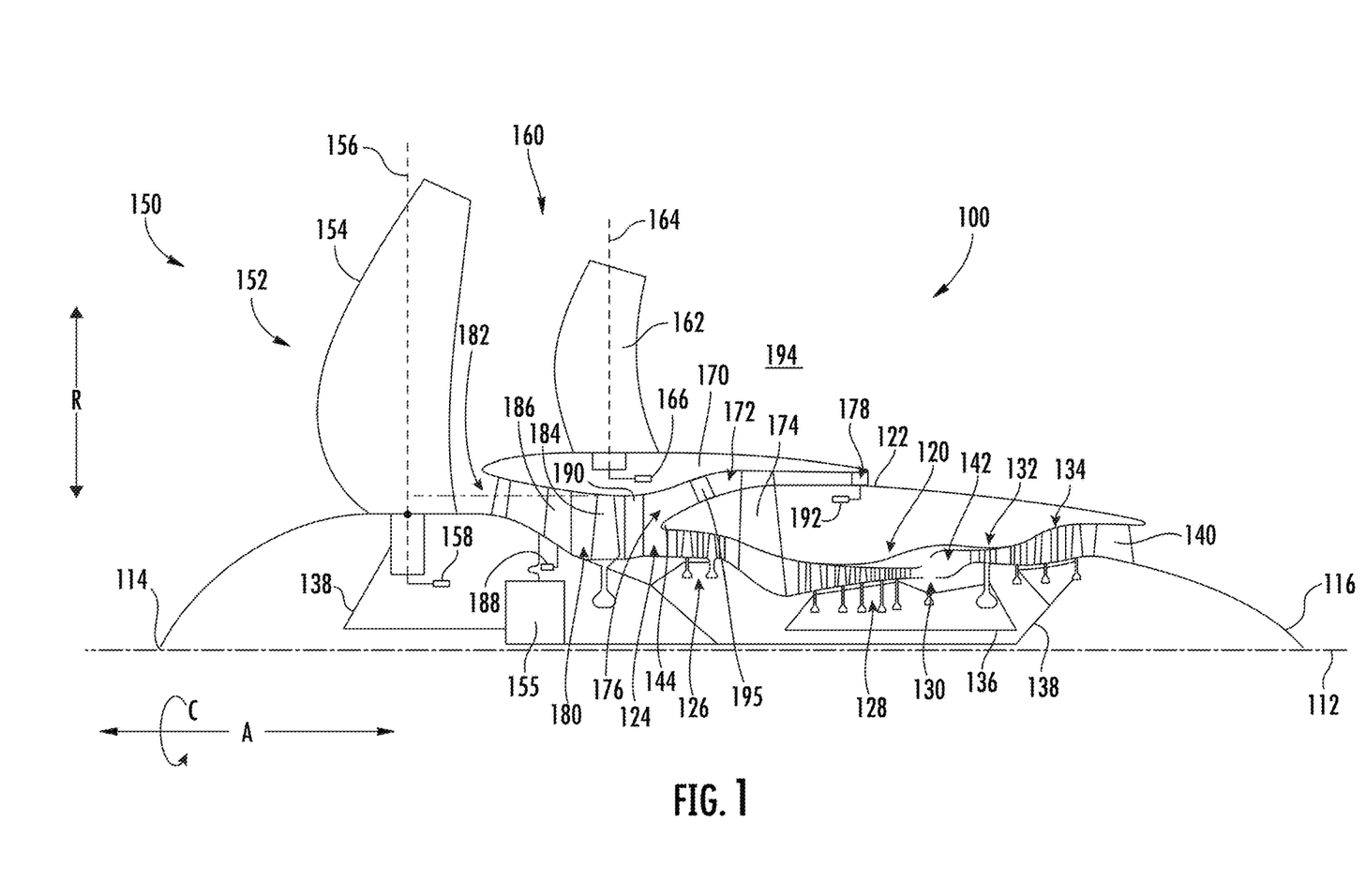
FIG. 1 is a schematic cross-sectional view of a gas turbine engine having an unducted fan in accordance with an exemplary aspect of the present disclosure.

Referring now to FIG. 1, a schematic cross-sectional view of an engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." Additionally, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g., coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vane 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, like the array of inlet guide vanes 186, the array of outlet guide vanes 190 are configured as variable-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 195 may be positioned in thermal communication with the fan duct 172. For example, one or more heat exchangers 195 may be disposed within the fan duct 172 and utilized to cool one or more fluids from the core engine with the air passing through the fan duct 172, as a resource for removing heat from a fluid, e.g., compressor bleed air, oil, or fuel.

Although not depicted, the heat exchanger 195 may be an annular heat exchanger extending substantially 360 degrees in the fan duct 172 (e.g., at least 300 degrees, such as at least 330 degrees). In such a manner, the heat exchanger 195 may effectively utilize the air passing through the fan duct 172 to cool one or more systems of the engine 100 (e.g., lubrication oil systems, compressor bleed air, electrical components, etc.). The heat exchanger 195 uses the air passing through fan duct 172 as a heat sink and correspondingly increases the temperature of the air downstream of the heat exchanger 195 and exiting the fan exhaust nozzle 178.

Figure 2:
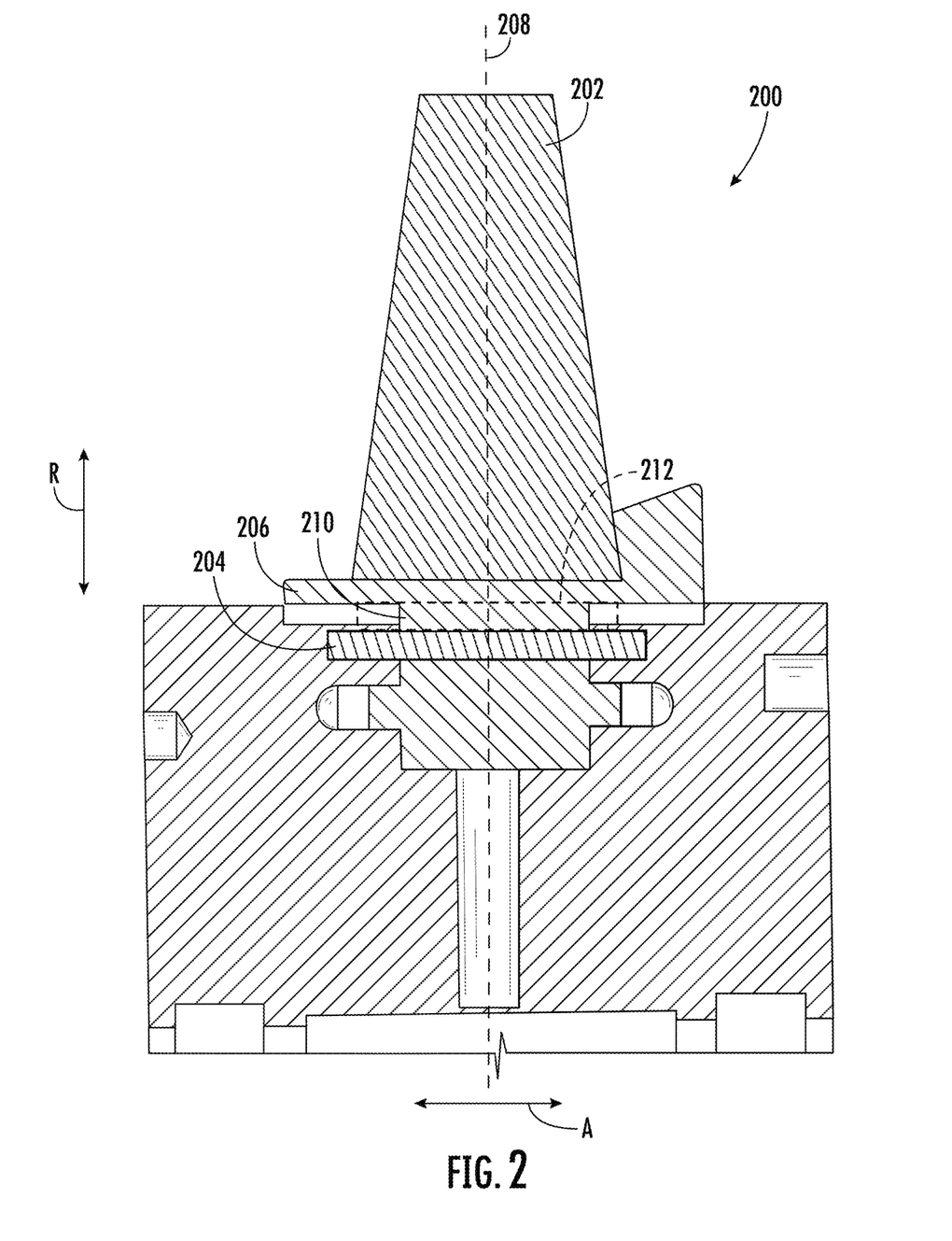
FIG. 2 is a cross-sectional view of a variable pitch airfoil assembly in accordance with an exemplary aspect of the present disclosure.

FIG. 2 is a cross-sectional view of a variable pitch airfoil assembly 200 in accordance with an exemplary aspect of the present disclosure. In particular, the variable pitch airfoil assembly 200 includes an airfoil 202 coupled to a disk 204 via a platform 206. The disk 204 may have an annular shape extending about an axial direction A. Moreover, the airfoil 202 extends outwardly from the disk 204 in a radial direction R. The airfoil 202 is rotatable relative to the disk 204 about a pitch axis 208. For example, the platform 206 may be coupled to a trunnion 210 that is configured to rotate about the pitch axis 208 relative to the disk 204 to rotate the airfoil 202. The trunnion 210 may be coupled to an actuator, such as the one or more actuators 188 (FIG. 1), to facilitate such rotation and therefore change a pitch of the airfoil 202 about pitch axis 208. In at least one example embodiment, the airfoil 202 may be an OGV, such as one or more of the outlet guide vanes 190 described herein with respect to the engine 100 of FIG. 1.

Although depicted above as an unshrouded or open rotor engine, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may also be applicable to turbofan, turboprop, or turboshaft engines.

As shown in FIG. 2, the variable pitch airfoil assembly 200 includes at least one damping element 212 disposed between the platform 206 and the disk 204. For example, the disk 204 is spaced from the platform 206 in the radial direction R and the at least one damping element 212 may be disposed between the platform 206 and the disk 204, such as via an interference fit. Moreover, the at least one damping element 212 is pre-loaded by interference fit between the platform 206 and the disk 204. The at least one damping element 212 is configured to provide vibration damping by friction between the at least one damping element 212, the disk 204, and the platform 206 while also allowing for a pitch change of the airfoil 202. In particular, the at least one damping element 212 is in slidable contact with the disk 204, the platform 206, or both the disk 204 and the platform 206 and resists movement of the disk 204 towards the platform 206, the platform 206 towards the disk 204, or both. The at least one damping element 212 further generates friction through contact with the platform 206, the disk 204, or both to provide vibration damping of these components during operation.

Figure 3A:
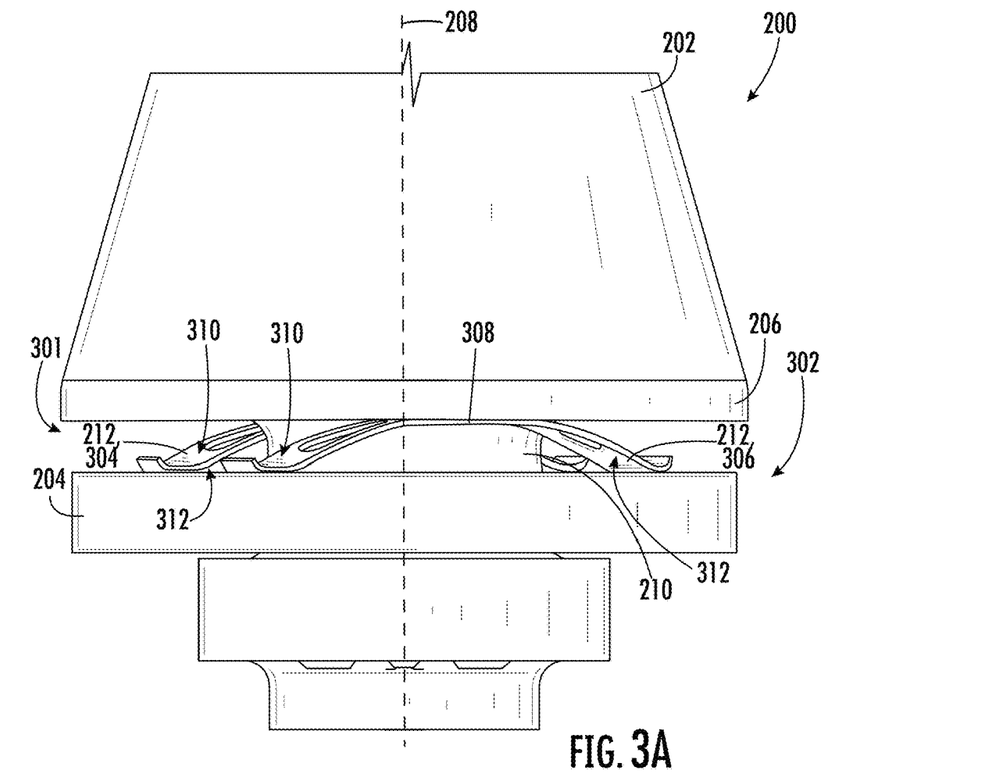
FIG. 3A is a cross-sectional view of a root portion of an airfoil coupled to a disk of the variable pitch airfoil assembly of FIG. 2.
Figure 3B:
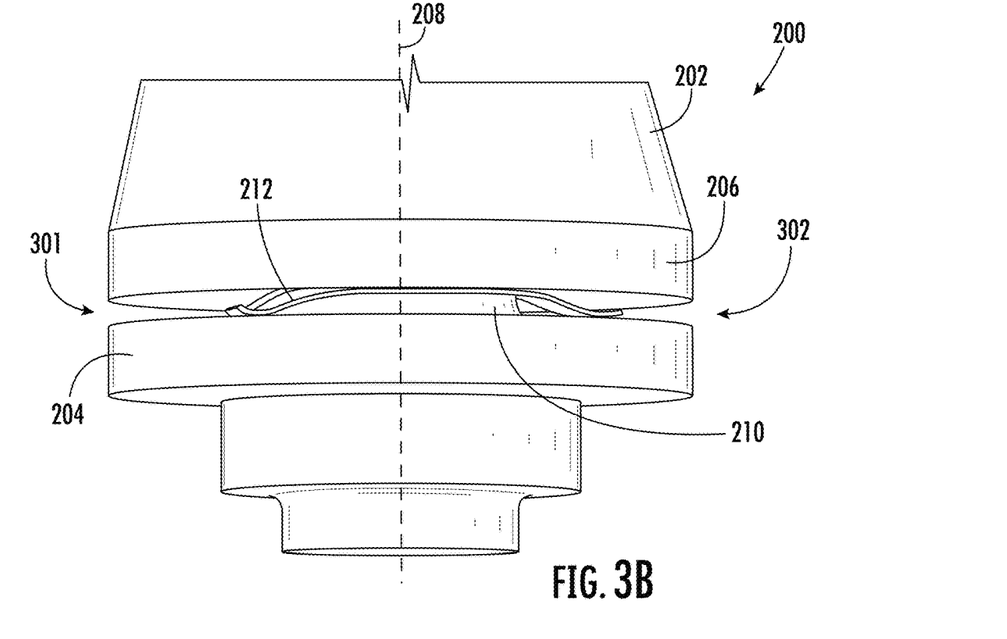
FIG. 3B is a cross-sectional view of the root portion of the airfoil coupled to the disk of the variable pitch airfoil assembly of FIG. 3A.

FIG. 3A is a cross-sectional view of a root portion of the airfoil 202 coupled to the disk 204 of the variable pitch airfoil assembly 200 of FIG. 2. FIG. 3B is a cross-sectional view of the root portion of the airfoil 202 coupled to the disk 204 of the variable pitch airfoil assembly 200 of FIG. 3A. More specifically, FIG. 3A illustrates the at least one damping element 212 in a first, unbiased position and FIG. 3B illustrates the at least one damping element 212 in a second, biased positioned.

In at least one example embodiment, the variable pitch airfoil assembly 200 may include a plurality of damping elements 212. For example, as shown, the at least one damping element 212 includes a first damping element 304 and a second damping element 306. The first damping element 304 may be disposed on first side of the disk 204 and the second damping element 306 may be disposed on a second side of the disk 204 opposite the first damping element 304. For example, the first damping element 304 and the second damping element 306 may be disposed on opposing sides of the trunnion 210.

As shown in FIGS. 3A-3B, the at least one damping element 212, including the first damping element 304 and the second damping element 306, may include an elongated, flexible member having an arcuate shape. For example, the at least one damping element 212 may include a leaf spring. Moreover, the at least one damping element 212 may extend between a first end 301 and a second end 302 opposite the first end 301. The at least one damping element 212 may include an arcuate portion 308 between the first end 301 and the second end 302. Additionally, the at least one damping element 212 includes a first surface 310 and a second surface 312 opposite the first surface 310. At least a portion of the first surface 310 is configured to contact the platform 206 and at least a portion of the second surface 312 is configured to contact the disk 204.

In at least one example embodiment, the second surface 312 of the at least one damping element 212 is coupled to the disk 204 at one of the first end 301 or the second end 302 such that the other of the first end 301 or the second end 302 is moveable relative to the disk 204. Additionally, the first surface 310 of the arcuate portion 308 may be moveable relative to the platform 206.

In other example embodiments, the first surface 310 of the arcuate portion 308 of the at least one damping element 212 may be coupled to the platform 206 such that the second surface 312 of the at least one damping element 212 is moveable at the first end 301 and the second end 302 relative to the disk 204.

Accordingly, the at least one damping element 212 is deformable such that the at least one damping element 212 moves between the first, unbiased position shown in FIG. 3A and the second, biased position shown in FIG. 3B for damping vibrations.

Figure 4A:
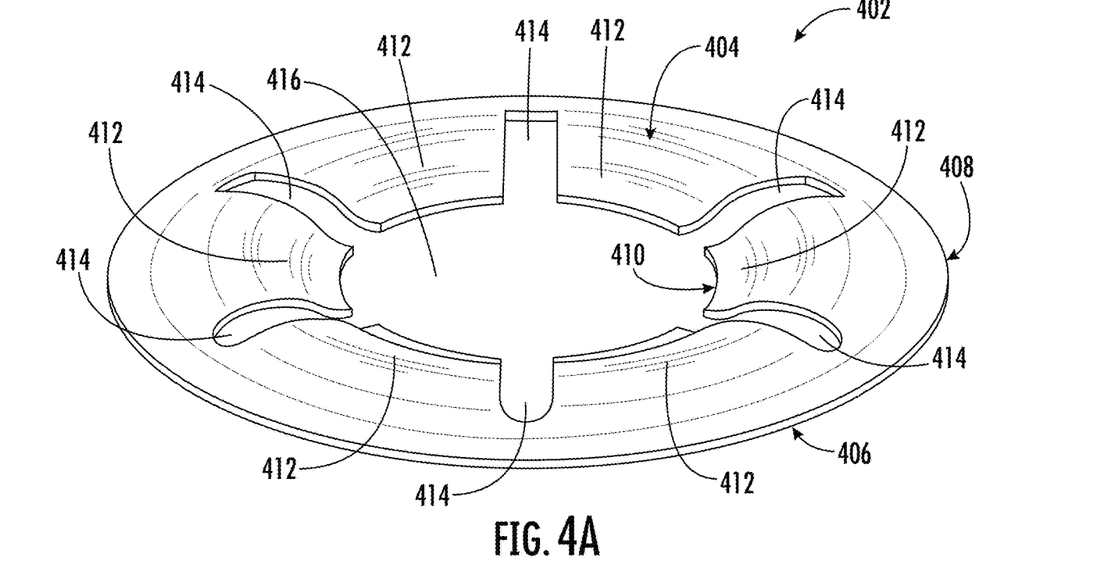
FIG. 4A is a top, perspective view of a damping element in accordance with an exemplary aspect of the present disclosure.
Figure 4B:
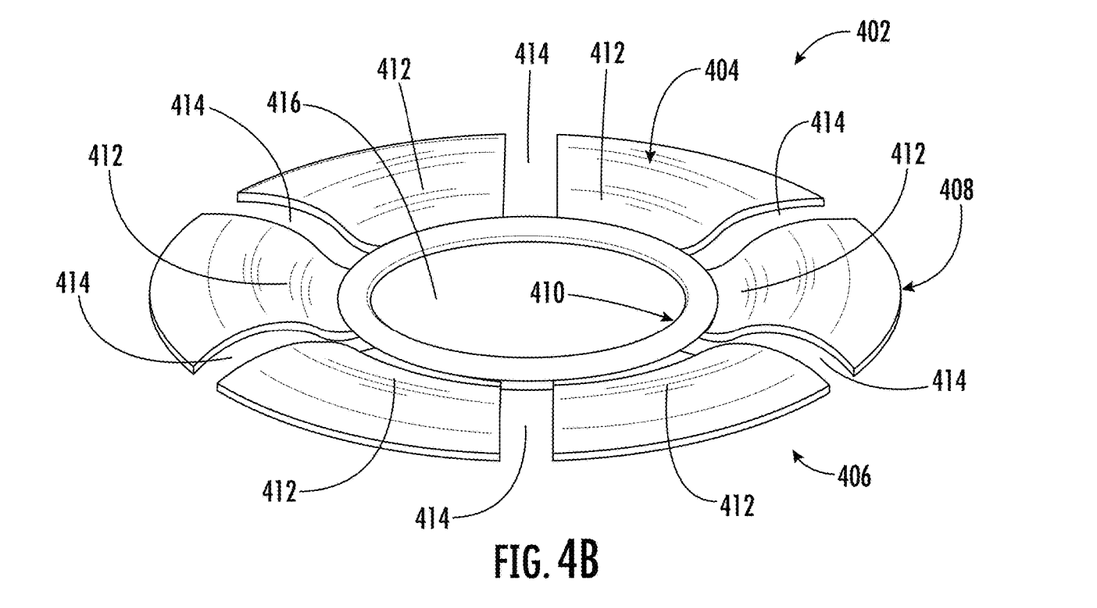
FIG. 4B is a top, perspective view of a damping element in accordance with an exemplary aspect of the present disclosure.
Figure 4C:
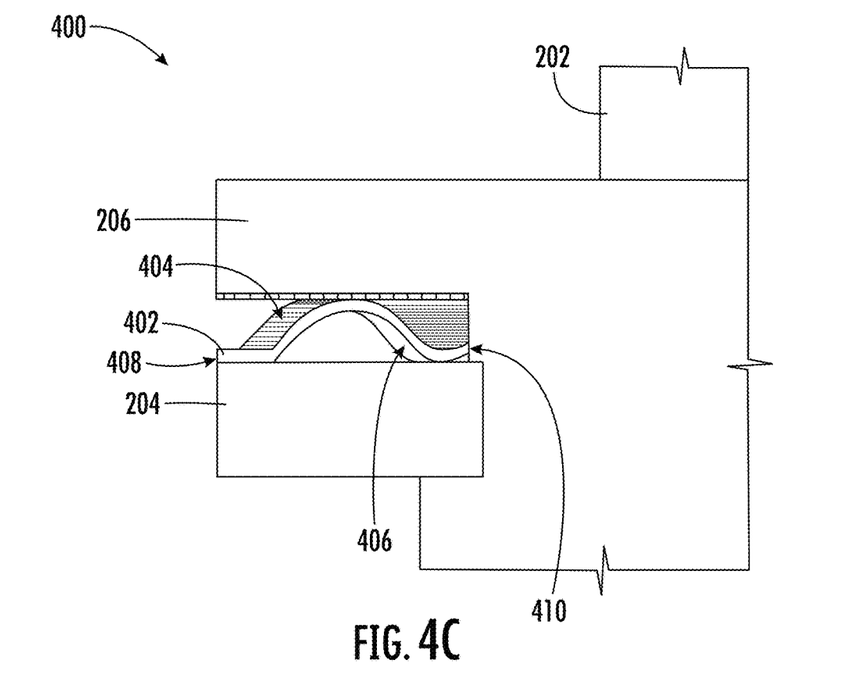
FIG. 4C is a cross-sectional view of a variable pitch airfoil assembly including the damping element of FIGS. 4A-4B in accordance with an exemplary aspect of the present disclosure.

FIG. 4A is a top, perspective view of a damping element 402 in accordance with an exemplary aspect of the present disclosure. FIG. 4B is a top, perspective view of the damping element 402 in accordance with another exemplary aspect of the present disclosure. FIG. 4C is a cross-sectional view of a variable pitch airfoil assembly 400 including the damping element 402 of FIGS. 4A-4B in accordance with an exemplary aspect of the present disclosure. The variable pitch airfoil assembly 400 may be similar or analogous to the variable pitch airfoil assembly 200 discussed with respect to FIGS. 2-3B. For example, the variable pitch airfoil assembly 400 includes the airfoil 202 coupled to the disk 204 via the platform 206.

In at least one example embodiment, the damping element 402 is disposed between the disk 204 and the platform 206. For example, the damping element 402 may be a damping ring surrounding the trunnion 210 (FIG. 2). The damping element 402 includes a first surface 404 and a second surface 406 opposite the first surface 404. As shown in FIG. 4C, at least a portion of the first surface 404 may be configured to contact the platform 206 and at least a portion of the second surface 406 may be configured to contact the disk 204. The damping element 402 also includes an outer portion 408 at an exterior of the damping element 402 and an inner portion 410 at an interior of the damping element 402 opposite the outer portion 408. For example, the outer portion 408 may circumscribe or surround the inner portion 410. Moreover, in an example embodiment, such as shown in FIG. 4A, the damping element 402 includes a plurality of flanges 412 extending from the outer portion 408 towards the inner portion 410 and a plurality of slots 414 defined between the plurality of flanges 412. At least a portion of the plurality of flanges 412 define an arcuate shape. Additionally, the damping element 402 defines a central opening 416 adjacent the inner portion 410. The central opening 416 may be configured to receive the trunnion 210 (FIG. 2).

In other example embodiments, such as shown in FIG. 4B, the inner portion 410 may include a solid, annular ring and the outer portion 408 may define the plurality of flanges 412 extending from the inner portion 410. For example, the inner portion 410 may define the central opening 416 and the plurality of flanges 412 may extend from the inner portion 410 outward and away from the central opening 416 towards the outer portion 408.

In at least one example embodiment, the second surface 406 of the damping element 402 may be coupled to the disk 204 at the outer portion 408 such that the plurality of flanges 412 and the inner portion 410 of the damping element 402 are moveable relative to the disk 204 and the platform 206. In other example embodiments, at least a portion of the second surface 406 of the plurality of flanges 412 may be coupled to the disk 204 adjacent the inner portion 410 such that at least a portion of the first surface 404 of the plurality of flanges 412 is moveable relative to the platform 206 and the second surface 406 of the damping element 402 adjacent the outer portion 408 is moveable relative to the disk 204. In still other example embodiments, at least a portion of the first surface 404 of the plurality of flanges 412 may be coupled to the platform 206 such that the second surface 406 is moveable relative to the disk 204 adjacent the outer portion 408 and the inner portion 410. Accordingly, the damping element 402 is deformable between the disk 204 and the platform 206 for damping vibrations.

Figure 5:
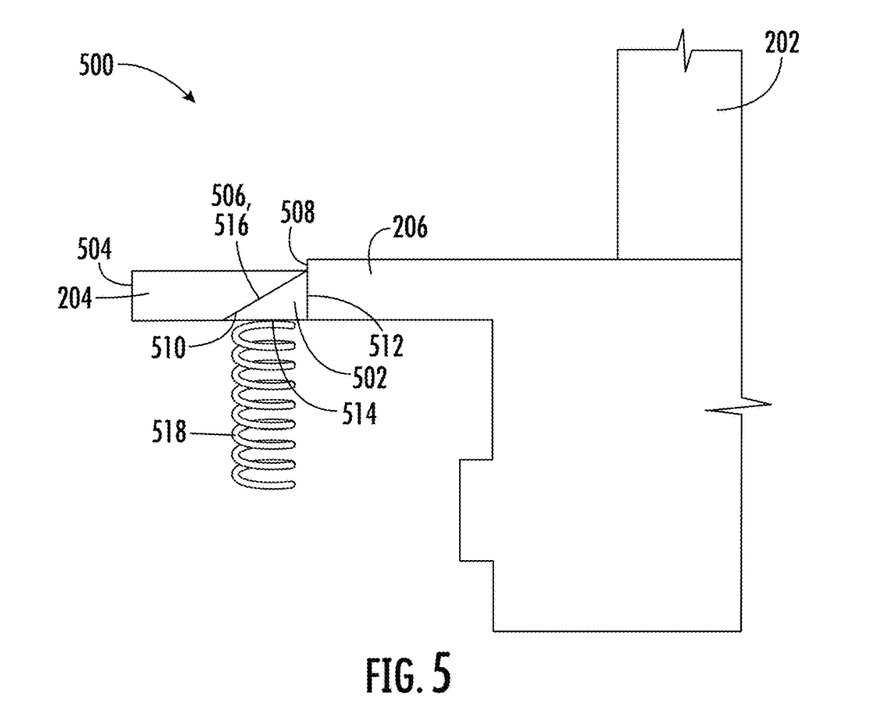
FIG. 5 is a cross-sectional view of a variable pitch airfoil assembly in accordance with an exemplary aspect of the present disclosure.

FIG. 5 is a cross-sectional view of a variable pitch airfoil assembly 500 in accordance with an exemplary aspect of the present disclosure. The variable pitch airfoil assembly 500 may be similar or analogous to the variable pitch airfoil assembly 200, 400 discussed with respect to FIGS. 2-4C. For example, the variable pitch airfoil assembly 500 includes the airfoil 202 coupled to the disk 204 via the platform 206.

In at least one example embodiment, the variable pitch airfoil assembly 500 includes at least one damping element 502 at least partially disposed between the disk 204 and the platform 206. For example, as shown in FIG. 5, the at least one damping element 502 may be disposed between an inner perimeter of the disk 204 and an outer perimeter of the platform 206. More particularly, the disk 204 includes a disk outer perimeter 504 and a disk inner perimeter 506. The disk inner perimeter 506 may be adjacent a platform outer perimeter 508. Accordingly, the at least one damping element 502 is disposed between the disk inner perimeter 506 and the platform outer perimeter 508. Moreover, the at least one damping element 502 may include a plurality of damping elements 502 in some example embodiments. For example, the plurality of damping elements 502 may be spaced about the platform outer perimeter 508. In such embodiments, the plurality of damping elements 502 may be equidistantly spaced about the platform outer perimeter 508. In other example embodiment, the plurality of damping elements 502 may be unequally spaced about the platform outer perimeter 508.

In at least one example embodiment, the at least one damping element 502 includes a wedge shape. For example, the at least one damping element 502 includes a sloped surface 510 extending at an angle relative to a first surface 512 and a second surface 514 of the at least one damping element. As shown in FIG. 5, the first surface 512 of the at least one damping element is perpendicular to the second surface 514. The sloped surface 510 may be configured to contact the disk inner perimeter 506. For example, the disk inner perimeter 506 may include a disk sloped surface 516 corresponding to the sloped surface 510 of the at least one damping element 502. Moreover, the first surface 512 of the at least one damping element 502 is configured to contact at least a portion of the platform outer perimeter 508.

In other example embodiments, the at least one damping element 502 may include a round, square, or other polygonal shape.

Still referring to FIG. 5, the variable pitch airfoil assembly 500 includes at least one biasing element 518 coupled to the at least one damping element 502. For example, the at least one biasing element 518 includes a spring or a leaf spring. The at least one biasing element 518 is configured to move between a biased and unbiased position such that the at least one damping element 502 moves relative to one or both of the disk 204 and the platform 206. For example, the at least one damping element 502 is configured to move relative to one or both of the disk inner perimeter 506 and the platform outer perimeter 508 for damping vibrations.

Figure 6:
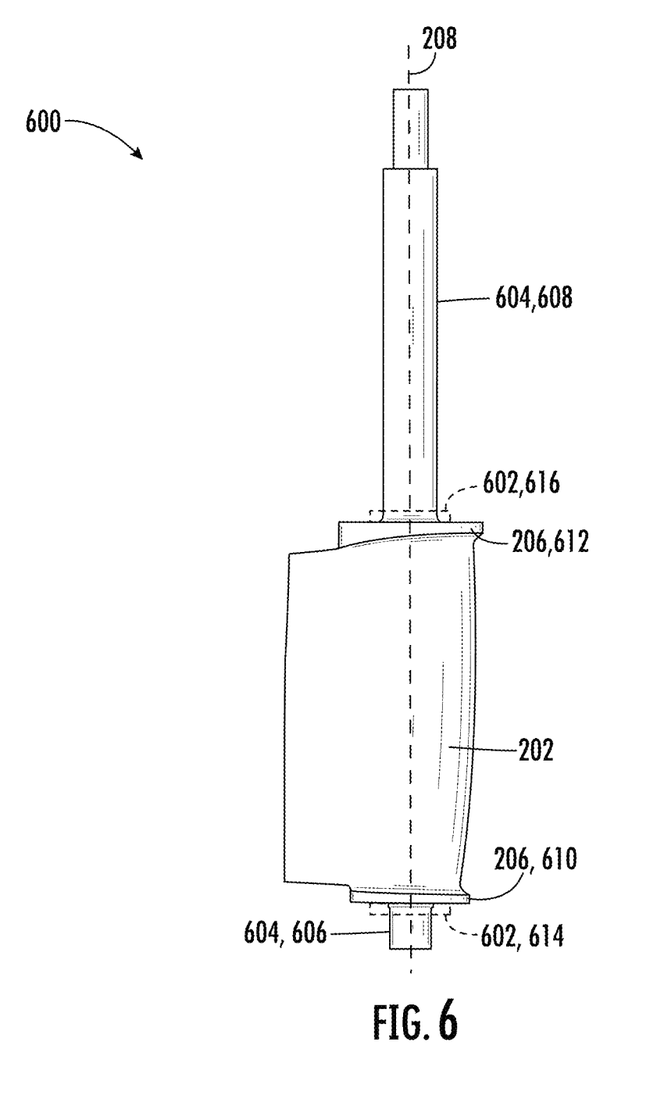
FIG. 6 is a side view of a variable pitch airfoil assembly in accordance with an exemplary aspect of the present disclosure.

FIG. 6 is a side view of a variable pitch airfoil assembly 600 in accordance with an exemplary aspect of the present disclosure. The variable pitch airfoil assembly 600 may be similar or analogous to the variable pitch airfoil assembly 200, 400, 500 discussed with respect to FIGS. 2-5. For example, the variable pitch airfoil assembly 600 includes the airfoil 202 coupled to the platform 206 and configured to rotate about the pitch axis 208.

In at least one example embodiment, the variable pitch airfoil assembly 200 includes one or more trunnions 604 for coupling the airfoils 202 to the engine 100 (FIG. 1) via the platform 206. The one or more trunnions 604 may be similar or analogous to the trunnion 210 discussed with respect to FIGS. 2-4C. Moreover, the one or more trunnions 604 may include an inner trunnion 606 and an outer trunnion 608 extending from opposing ends of the airfoil 202. In at least one example embodiment, the airfoil 202 is a variable stator vane (VSV) of a variable pitch stator vane assembly. Moreover, the airfoil 202 may be configured as one or more of the outlet guide vanes 190 (FIG. 1) such that the inner trunnion 606 is coupled to an inner casing of the engine 100 and the outer trunnion 608 is coupled to an outer casing opposite the inner casing, such as a portion of the fan cowl 170 (FIG. 1). One or both of the inner trunnion 606 and the outer trunnion 608 may be coupled to an actuator, such as the one or more actuators 188 (FIG. 1), to facilitate rotation of the airfoil 202, and therefore a pitch of the airfoil 202, about the pitch axis 208.

In at least one example embodiment, the platform 206 includes a first platform 610 and a second platform 612. The first platform 610 couples the airfoil 202 to the inner trunnion 606 and the second platform 612 is opposite the first platform 610 for coupling the airfoil 202 to the outer trunnion 608. Additionally, the variable pitch airfoil assembly 600 may include at least one damping element 602 coupled to the platform 206 and the one or more trunnions 604 for damping vibrations. More specifically, the at least one damping element 602 may include a first damping element 614 coupled to the first platform 610 and the inner trunnion 606 and a second damping element 616 coupled to the second platform 612 and the outer trunnion 608. The at least one damping element 602, including the first damping element 614 and the second damping element 616, may be similar or analogous to the damping element 212, 402, 502 discussed with respect to FIGS. 2-5. For example, the first damping element 614 and the second damping element 616 may be at least partially disposed about the inner trunnion 606 and the outer trunnion 608, respectively. It should be understood that any suitable number of the at least one damping element 602 may be arranged in the variable pitch airfoil assembly 600 to provide a desired amount of damping and the at least one damping element 602 may be arranged in any suitable manner.

Accordingly, the present disclosure provides damping elements for damping vibrations of non-rotating airfoils, such as OGVs and VSVs, while also allowing for a pitch of the airfoils to be changed.

Further aspects are provided by the subject matter of the following clauses:

A variable pitch airfoil assembly for an engine, the variable pitch airfoil assembly comprising: a disk having an annular shape extending about an axial direction; an airfoil coupled to the disk via a platform, the airfoil extending outwardly from the disk in a radial direction and being rotatable relative to the disk about a pitch axis; and at least one damping element disposed between the platform and the disk, the at least one damping element configured to provide vibration damping by friction between the at least one damping element, the disk, and the platform while also allowing for a pitch change of the airfoil.

The variable pitch airfoil assembly of any preceding clause, wherein the at least one damping element is in slidable contact with the platform, the disk, or both to generate friction with the platform, the disk, or both.

The variable pitch airfoil assembly of any preceding clause, wherein the at least one damping element is preloaded by interference fit between the platform and the disk.

The variable pitch airfoil assembly of any preceding clause, wherein: the at least one damping element extends between a first end and a second end opposite the first end; the at least one damping element comprises an arcuate portion between the first end and the second end; and the at least one damping element comprises a first surface and a second surface opposite the first surface, at least a portion of the first surface contacting the platform and at least a portion of the second surface contacting the disk.

The variable pitch airfoil assembly of any preceding clause, wherein: the second surface is coupled to the platform at one of the first end or the second end such that the other of the first end and the second end is moveable relative to the disk; and the first surface of the arcuate portion is moveable relative to the platform.

The variable pitch airfoil assembly of any preceding clause, wherein: the first surface of the arcuate portion is coupled to the platform; and the second surface of the first end and the second end of the at least one damping element is moveable relative to the disk.

The variable pitch airfoil assembly of any preceding clause, wherein the at least one damping element comprises a first damping element disposed on a first side of the disk and a second damping element disposed on a second side of the disk opposite the first damping element.

The variable pitch airfoil assembly of any preceding clause, wherein the at least one damping element comprises an elongated, flexible member having an arcuate shape.

The variable pitch airfoil assembly of any preceding clause, wherein the at least one damping element comprises a leaf spring.

The variable pitch airfoil assembly of any preceding clause, wherein the airfoil is an outlet guide vane (OGV).

The variable pitch airfoil assembly of any preceding clause, wherein the disk is spaced from the platform in the radial direction.

The variable pitch airfoil assembly of any preceding clause, wherein the at least one damping element comprises a damping ring.

The variable pitch airfoil assembly of any preceding clause, wherein the damping ring comprises: a first surface and a second surface opposite the first surface; an outer portion adjacent an exterior of the damping ring; and a plurality of flanges extending from the outer portion towards an inner portion of the damping ring and comprising an arcuate shape.

The variable pitch airfoil assembly of any preceding clause, wherein the damping ring defines a plurality of slots between the plurality of flanges.

The variable pitch airfoil assembly of any preceding clause, wherein the second surface of the outer portion is configured to be coupled to the disk and the plurality of flanges are moveable relative to the platform and the disk.

The variable pitch airfoil assembly of any preceding clause, wherein: at least a portion of the second surface of the plurality of flanges adjacent the inner portion of the damping ring are coupled to the disk; at least a portion of the first surface of the plurality of flanges is moveable relative to the platform; and the second surface of the outer portion is moveable relative to the disk.

The variable pitch airfoil assembly of any preceding clause, wherein at least a portion of the first surface of the plurality of flanges is configured to be coupled to the platform such that at least a portion of the second surface is moveable relative to the disk adjacent the outer portion and the inner portion.

The variable pitch airfoil assembly of any preceding clause, wherein the damping ring comprises: a first surface and a second surface opposite the first surface; an inner portion defining a central opening; and a plurality of flanges extending from the inner portion towards an outer portion of the damping ring and comprising an arcuate shape.

The variable pitch airfoil assembly of any preceding clause, wherein the variable pitch airfoil assembly is a variable pitch stator vane assembly, and the airfoil is a stator vane.

The variable pitch airfoil assembly of any preceding clause, wherein the airfoil is coupled to the engine via one or more trunnions.

The variable pitch airfoil assembly of any preceding clause, wherein: the one or more trunnions comprise an inner trunnion coupled to an inner casing of the engine and an outer trunnion coupled to an outer casing of the engine; and the platform comprises a first platform coupling the airfoil to the inner trunnion and a second platform coupling the airfoil to the outer trunnion.

The variable pitch airfoil assembly of any preceding clause, wherein the airfoil is a variable stator vane (VSV).

The variable pitch airfoil assembly of any preceding clause, wherein the at least one damping element is disposed between a disk inner perimeter and a platform outer perimeter.

The variable pitch airfoil assembly of any preceding clause, wherein the at least one damping element comprises a plurality of damping elements equidistantly spaced about the platform outer perimeter.

The variable pitch airfoil assembly of any preceding clause, wherein the at least one damping element comprises a plurality of damping elements unequally spaced about the platform outer perimeter.

The variable pitch airfoil assembly of any preceding clause, further comprising at least one biasing element coupled to the at least one damping element.

The variable pitch airfoil assembly of any preceding clause, wherein the at least on biasing element comprises a spring or a leaf spring.

The variable pitch airfoil assembly of any preceding clause, wherein the at least one damping element comprises a wedge shape.

An engine, comprising: an unducted fan; a ducted fan located downstream of the unducted fan; a variable pitch airfoil assembly located downstream of the ducted fan, the variable pitch airfoil assembly comprising: a disk having an annular shape extending about an axial direction, an airfoil coupled to the disk via a platform, the airfoil extending outwardly from the disk in a radial direction and being rotatable relative to the disk about a pitch axis, and at least one damping element disposed between the platform and the disk, the at least one damping element configured to provide vibration damping by friction between the at least one damping element, the disk, and the platform while also allowing for a pitch change of the airfoil; and a turbomachine located downstream of the variable pitch airfoil assembly, the turbomachine comprising a compressor section, a combustion section, a turbine section, and an exhaust section.

The engine of any preceding clause, wherein the at least one damping element is in slidable contact with the platform, the disk, or both to generate friction with the platform, the disk, or both.

The engine of any preceding clause, wherein the at least one damping element is pre-loaded by interference fit between the platform and the disk.

The engine of any preceding clause, wherein: the at least one damping element extends between a first end and a second end opposite the first end; the at least one damping element comprises an arcuate portion between the first end and the second end; and the at least one damping element comprises a first surface and a second surface opposite the first surface, at least a portion of the first surface contacting the platform and at least a portion of the second surface contacting the disk.

The engine of any preceding clause, wherein: the second surface is coupled to the disk at one of the first end or the second end such that the other of the first end or the second end is moveable relative to the disk; and the first surface of the arcuate portion is moveable relative to the platform.

The engine of any preceding clause, wherein: the first surface of the arcuate portion is coupled to the platform; and the second surface of the first end and the second end of the at least one damping element is moveable relative to the disk.

The engine of any preceding clause, wherein the at least one damping element comprises a first damping element disposed on a first side of the disk and a second damping element disposed on a second side of the disk opposite the first damping element.

The engine of any preceding clause, wherein the at least one damping element comprises an elongated, flexible member having an arcuate shape.

The engine of any preceding clause, wherein the at least one damping element comprises a leaf spring.

The engine of any preceding clause, wherein the airfoil is an outlet guide vane (OGV).

The engine of any preceding clause, wherein the disk is spaced from the platform in the radial direction.

The engine of any preceding clause, wherein the at least one damping element comprises a damping ring.

The engine of any preceding clause, wherein the damping ring comprises: a first surface and a second surface opposite the first surface; an outer portion adjacent an exterior of the damping ring; and a plurality of flanges extending from the outer portion towards an inner portion of the damping ring and comprising an arcuate shape.

The engine of any preceding clause, wherein the damping ring defines a plurality of slots between the plurality of flanges.

The engine of any preceding clause, wherein the second surface of the outer portion is configured to be coupled to the disk and the plurality of flanges are moveable relative to the platform and the disk.

The engine of any preceding clause, wherein: at least a portion of the second surface of the plurality of flanges adjacent the inner portion of the damping ring are coupled to the disk; at least a portion of the first surface of the plurality of flanges is moveable relative to the platform; and the second surface of the outer portion is moveable relative to the disk.

The engine of any preceding clause, wherein at least a portion of the first surface of the plurality of flanges is configured to be coupled to the platform such that at least a portion of the second surface is moveable relative to the disk adjacent the outer portion and the inner portion.

The engine of any preceding clause, wherein the damping ring comprises: a first surface and a second surface opposite the first surface; an inner portion defining a central opening; and a plurality of flanges extending from the inner portion towards an outer portion of the damping ring and comprising an arcuate shape.

The engine of any preceding clause, wherein the variable pitch airfoil assembly is a variable pitch stator vane assembly, and the airfoil is a stator vane.

The engine of any preceding clause, wherein the airfoil is coupled to the engine via one or more trunnions.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A variable pitch airfoil assembly for an engine, the variable pitch airfoil assembly comprising:
   a disk having an annular shape extending about an axial direction;
   an airfoil coupled to the disk via a platform, the airfoil extending outwardly from the disk in a radial direction and being rotatable relative to the disk about a pitch axis; and
   at least one damping element disposed between the platform and the disk, the at least one damping element configured to provide vibration damping by friction between the at least one damping element, the disk, and the platform while also allowing for a pitch change of the airfoil.

2. The variable pitch airfoil assembly of claim 1, wherein the at least one damping element is in slidable contact with the platform, the disk, or both to generate friction with the platform, the disk, or both.

3. The variable pitch airfoil assembly of claim 1, wherein the at least one damping element is pre-loaded by interference fit between the platform and the disk.

4. The variable pitch airfoil assembly of claim 1, wherein:
   the at least one damping element extends between a first end and a second end opposite the first end;
   the at least one damping element comprises an arcuate portion between the first end and the second end; and
   the at least one damping element comprises a first surface and a second surface opposite the first surface, at least a portion of the first surface contacting the platform and at least a portion of the second surface contacting the disk.

5. The variable pitch airfoil assembly of claim 4, wherein:
   the second surface is coupled to the disk at one of the first end or the second end such that the other of the first end or the second end is moveable relative to the disk; and
   the first surface of the arcuate portion is moveable relative to the platform.

6. The variable pitch airfoil assembly of claim 4, wherein:
   the first surface of the arcuate portion is coupled to the platform; and
   the second surface of the first end and the second end of the at least one damping element is moveable relative to the disk.

7. The variable pitch airfoil assembly of claim 1, wherein the at least one damping element comprises a first damping element disposed on a first side of the disk and a second damping element disposed on a second side of the disk opposite the first damping element.

8. The variable pitch airfoil assembly of claim 1, wherein the at least one damping element comprises an elongated, flexible member having an arcuate shape.

9. The variable pitch airfoil assembly of claim 1, wherein the at least one damping element comprises a leaf spring.

10. The variable pitch airfoil assembly of claim 1, wherein the airfoil is an outlet guide vane (OGV).

11. The variable pitch airfoil assembly of claim 1, wherein the disk is spaced from the platform in the radial direction.

12. The variable pitch airfoil assembly of claim 1, wherein the at least one damping element comprises a damping ring.

13. The variable pitch airfoil assembly of claim 12, wherein the damping ring comprises:
    a first surface and a second surface opposite the first surface;
    an outer portion adjacent an exterior of the damping ring; and
    a plurality of flanges extending from the outer portion towards an inner portion of the damping ring and comprising an arcuate shape.

14. The variable pitch airfoil assembly of claim 13, wherein the damping ring defines a plurality of slots between the plurality of flanges; and
    wherein the outer portion is a continuous ring.

15. The variable pitch airfoil assembly of claim 13, wherein the second surface of the outer portion is configured to be coupled to the disk and the plurality of flanges are moveable relative to the platform and the disk.

16. The variable pitch airfoil assembly of claim 13, wherein:
    at least a portion of the second surface of the plurality of flanges adjacent the inner portion of the damping ring are coupled to the disk;
    at least a portion of the first surface of the plurality of flanges is moveable relative to the platform; and
    the second surface of the outer portion is moveable relative to the disk.

17. The variable pitch airfoil assembly of claim 13, wherein at least a portion of the first surface of the plurality of flanges is configured to be coupled to the platform such that at least a portion of the second surface is moveable relative to the disk adjacent the outer portion and the inner portion.

18. The variable pitch airfoil assembly of claim 12, wherein the damping ring comprises:
    a first surface and a second surface opposite the first surface;
    an inner portion defining a central opening; and
    a plurality of flanges extending from the inner portion towards an outer portion of the damping ring and comprising an arcuate shape.

19. The variable pitch airfoil assembly of claim 1, wherein the variable pitch airfoil assembly is a variable pitch stator vane assembly, and the airfoil is a stator vane.

20. The variable pitch airfoil assembly of claim 1, wherein the airfoil is coupled to the engine via one or more trunnions.

* * * * *